US012770972B2

(12) United States Patent
Lim et al.

(10) Patent No.: US 12,770,972 B2
(45) Date of Patent: Oct. 20, 2026

(54) PACK HOUSING INCLUDING INTEGRATED FILTER MESH APPLIED TO VENTING HOLE, AND BATTERY PACK INCLUDING THE SAME

(71) Applicant: LG ENERGY SOLUTION, LTD., Seoul (KR)

(72) Inventors: Jae-Bum Lim, Daejeon (KR); Bum-Hyun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 989 days.

(21) Appl. No.: 17/922,992

(22) PCT Filed: Oct. 26, 2021

(86) PCT No.: PCT/KR2021/015137
§ 371 (c)(1),
(2) Date: Nov. 3, 2022

(87) PCT Pub. No.: WO2022/092777
PCT Pub. Date: May 5, 2022

(65) Prior Publication Data
US 2023/0178847 A1 Jun. 8, 2023

(30) Foreign Application Priority Data
Oct. 27, 2020 (KR) ........................ 10-2020-0140699

(51) Int. Cl.
*H01M 50/30* (2021.01)
*H01M 50/204* (2021.01)
*H01M 50/218* (2021.01)

(52) U.S. Cl.
CPC ....... *H01M 50/394* (2021.01); *H01M 50/204* (2021.01); *H01M 50/218* (2021.01)

(58) Field of Classification Search
CPC . H01M 50/394; H01M 50/204; H01M 50/218
See application file for complete search history.

(56) References Cited

U.S. PATENT DOCUMENTS 3,904,441 A 9/1975 Badger
2009/0197153 A1* 8/2009 Fujikawa et al. ..... H01M 50/30 429/82

(Continued)

FOREIGN PATENT DOCUMENTS

CN 103824987 A 5/2014
CN 108352472 A 7/2018

(Continued)

OTHER PUBLICATIONS

Extended European Search Report for European Application No. 21886771.1, dated Jun. 11, 2024.

(Continued)

*Primary Examiner* — Matthew T Martin
*Assistant Examiner* — Alexandra J Simmons
(74) *Attorney, Agent, or Firm* — Birch, Stewart, Kolasch & Birch, LLP

(57) ABSTRACT

A pack housing includes an internal space capable of accommodating battery cells. The pack housing also includes a venting hole provided in at least one surface of the pack housing to communicate with the internal space; and a hole cover assembly configured to cover the venting hole. The hole cover assembly includes a filter mesh including a resin filter layer formed of a resin and a mesh integrated with the resin filter layer by insert injection and placed in the venting hole; and a mounting plate provided in the form of a frame having an empty center and coupled to the at least one surface of the pack housing while pressing an edge region of the filter mesh.

12 Claims, 4 Drawing Sheets

(56) References Cited

U.S. PATENT DOCUMENTS

| | | | | |
|---|---|---|---|---|
| 2010/0227544 | A1 | 9/2010 | Furuyama et al. | |
| 2012/0295140 | A1 | 11/2012 | Cho et al. | |
| 2015/0147605 | A1 | 5/2015 | Kim et al. | |
| 2018/0241017 | A1 | 8/2018 | Nakamura et al. | |
| 2019/0027719 | A1 | 1/2019 | Kim et al. | |
| 2019/0036091 | A1* | 1/2019 | Lee et al. .......... | H01M 10/6551 |
| 2019/0260059 | A1 | 8/2019 | Mizusaki et al. | |
| 2021/0265697 | A1 | 8/2021 | Nakayama et al. | |

FOREIGN PATENT DOCUMENTS

| | | | |
|---|---|---|---|
| CN | 209434353 | U | 9/2019 |
| JP | 54-017034 | U | 2/1979 |
| JP | 57-014366 | U | 1/1982 |
| JP | 2009-212081 | A | 9/2009 |
| JP | 2019-512844 | A | 5/2019 |
| JP | 2019-220592 | A | 12/2019 |
| KR | 10-2012-0128473 | A | 11/2012 |
| KR | 10-1522199 | B1 | 5/2015 |
| KR | 10-2015-0061200 | A | 6/2015 |
| KR | 10-2017-0031567 | A | 3/2017 |
| KR | 10-2035131 | B1 | 10/2019 |
| KR | 10-2061872 | B1 | 1/2020 |
| KR | 10-2083657 | B1 | 3/2020 |
| KR | 10-2091770 | B1 | 3/2020 |
| WO | WO 2013/008366 | A1 | 1/2013 |

OTHER PUBLICATIONS

International Search Report (PCT/ISA/210) issued in PCT/KR2021/015137, mailed Feb. 25, 2022.

* cited by examiner

PACK HOUSING INCLUDING INTEGRATED FILTER MESH APPLIED TO VENTING HOLE, AND BATTERY PACK INCLUDING THE SAME

TECHNICAL FIELD

The present disclosure relates to pack housings, and more particularly, to a pack housing including an integrated filter mesh that can reduce man-hours and satisfy waterproof and dustproof performance when assembled to a venting hole for gas discharge, and a battery pack including the pack housing.

The present application claims priority to Korean Patent Application No. 10-2020-0140699 filed on Oct. 27, 2020 in the Republic of Korea, the disclosures of which are incorporated herein by reference.

BACKGROUND ART

An energy storage system (ESS) battery pack is equipped with secondary battery cells to store power during a day time and can take out and use the power when needed. For example, the ESS battery pack is a form of storing electricity generated using solar panels or wind power generation in secondary battery cells and then taking out and use the electricity.

The size and weight of the ESS battery pack can be configured differently depending on its storage capacity. For example, an ESS battery pack for home use may be provided in a rectangular box shape of approximately 120×80×20 cm (height×width×thickness), and may be provided to be installed on a wall or a pole indoors or outdoors by using a bracket or the like.

When overcharging occurs in a secondary battery cell during charging/discharging or an internal short circuit occurs due to any factor in the secondary battery cell, the temperature of the secondary battery cell increases and gas is generated through a chemical reaction and may leak from the secondary battery cell. The ESS battery pack includes a venting hole to discharge the gas to the outside. The venting hole is generally provided in a lower surface or upper surface of a pack housing.

Because the ESS battery pack is a product subject to safety certification, an Ingress Protection (IP) rating equal to or greater than a certain level is required. Accordingly, a waterproof and dustproof unit is applied to the venting hole to prevent moisture or foreign substances from entering the pack housing through the venting hole in normal times.

As an example of the waterproof and dustproof unit according to the conventional art, a fiber filter is disposed between two meshes of a size corresponding to the venting hole. However, as a thick fiber filter is disposed between the two meshes to satisfy the IP rating, the thickness of the waterproof and dustproof unit increases, and it is difficult to align and assemble each of the meshes and the fiber filter to fit to the venting hole.

DISCLOSURE

Technical Problem

The present disclosure is designed to solve the problems of the related art, and therefore the present disclosure is directed to providing a pack housing including a waterproof and dustproof unit that can reduce man-hours and satisfy waterproof and dustproof performance when applied to a venting hole included in the pack housing, and a battery pack including the pack housing.

The technical problems to be solved in the present disclosure are not limited to the above, and other problems that are not mentioned could be clearly understood by one of ordinary skill in the art from the description of the present disclosure below.

Technical Solution

In one aspect of the present disclosure, there is provided a pack housing including an internal space capable of accommodating battery cells. The pack housing includes a venting hole provided in at least one surface of the pack housing to communicate with the internal space; and a hole cover assembly configured to cover the venting hole, wherein the hole cover assembly includes a filter mesh including a resin filter layer formed of a resin and a mesh integrated with the resin filter layer by insert injection and placed in the venting hole; and a mounting plate including a frame having an empty center and coupled to the at least one surface of the pack housing while pressing an edge region of the filter mesh.

The at least one surface may be at least one of a bottom plate forming a bottom surface of the pack housing and a top plate forming a top surface of the pack housing.

The mesh may be formed of a metal material and include a first mesh and a second mesh disposed to face the first mesh a predetermined distance apart from the first mesh, and the resin filter layer may be located between the first mesh and the second mesh.

The mesh may further include an outer frame connected to an edge region of the first mesh and an edge region of the second mesh and surrounding the resin filter layer.

The resin filter layer may include a first filter layer and a second filter layer disposed to face the first filter layer a predetermined distance apart from the first filter layer, and the mesh may be formed of a metal material, and may be located between the first filter layer and the second filter layer.

An edge region of the mesh may extend in a vertical direction to surround the first filter layer and the second filter layer.

The resin filter layer may be made of at least one of a fluororesin, a polyurethane resin, and an epoxy resin.

The pack housing may include a housing main body formed in a hollow structure and having a lower end portion coupled to the bottom plate and an upper end portion coupled to the top plate.

The bottom plate or the top plate may include a recessed portion recessed along the periphery of the venting hole to be able to mount an edge region of the filter mesh. The recessed portion may include, in its corner region, a column in which a thread is formed along the inner circumferential surface of its inner diameter. A corner region of the filter mesh may be cut out, and the mounting plate may have a bolt fastening hole in a corner area and may be fixed to the column by a bolt member fitted into the bolt fastening hole.

In another aspect of the present disclosure, there is provided an energy storage system (ESS) battery pack for home use including the above-described pack housing.

Advantageous Effects

According to an aspect of the present disclosure, provided are a pack housing including an integrated filter mesh that can reduce man-hours and satisfy waterproof and dustproof performance when applied to a venting hole for gas discharge, and a battery pack including the pack housing.

The effects of the present disclosure are not limited to the aforementioned effects, and effects not mentioned will be clearly understood by those of ordinary skill in the art to which the present disclosure belongs from the present specification and the accompanying drawings.

MODE FOR DISCLOSURE

Figure 1:
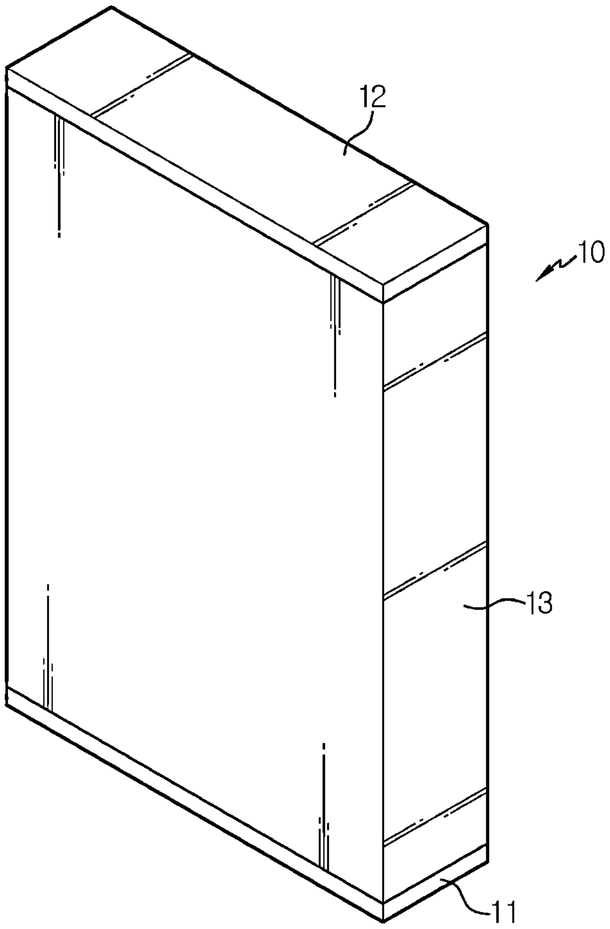
FIG. 1 is a perspective view of the exterior of a battery pack according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the present disclosure, so it should be understood that other equivalents and modifications could be made thereto without departing from the scope of the present disclosure.

Since embodiments of the present disclosure are provided to more completely explain the present disclosure to those skilled in the art, the shapes and sizes of components in the drawings may be exaggerated, omitted, or schematically illustrated for clearer description. Thus, the size or proportion of each component do not fully reflect an actual size or proportion thereof.

Figure 2:
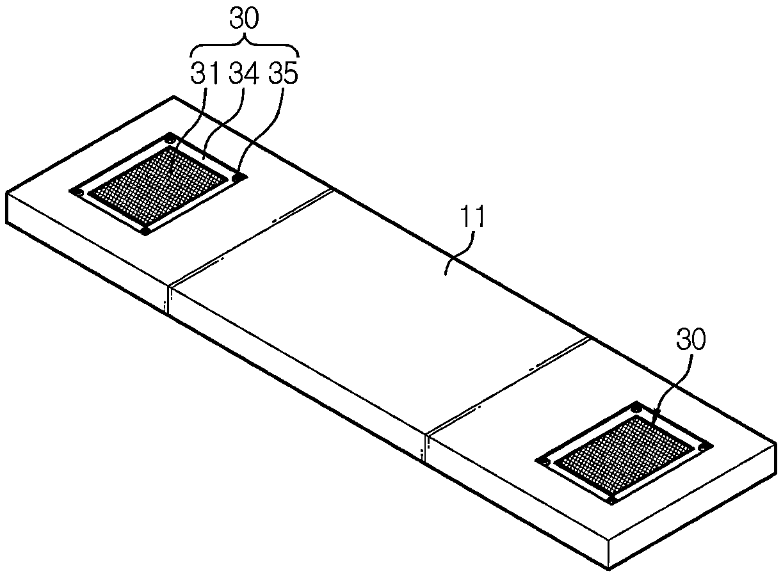
FIG. 2 is a perspective view of a bottom plate of a pack housing of FIG. 1.
Figure 3:
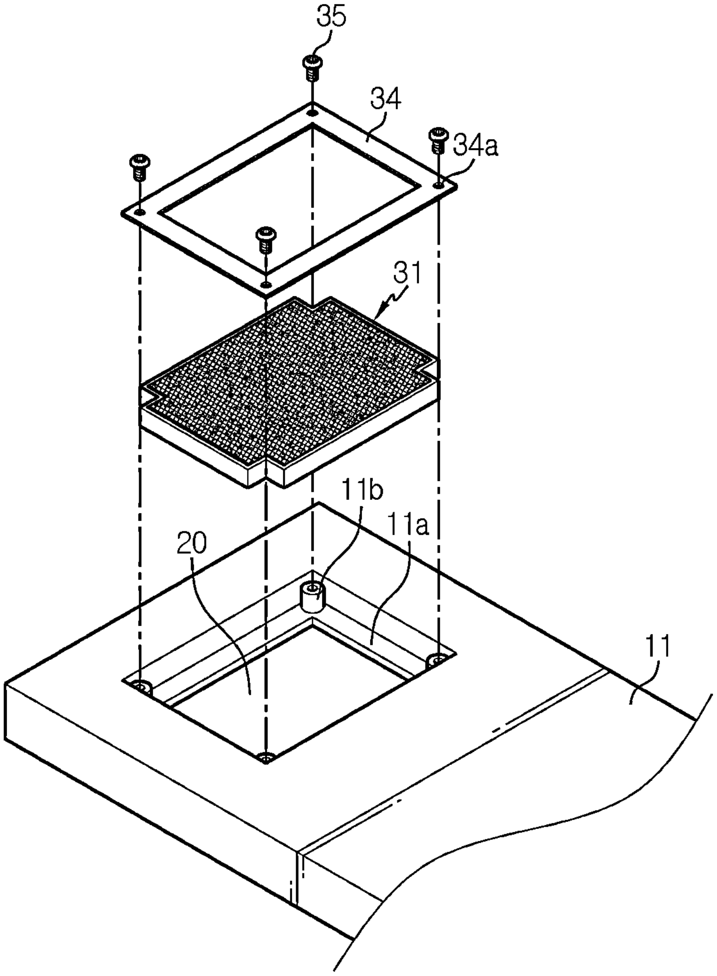
FIG. 3 is an exploded perspective view of a hole cover assembly according to an embodiment of the present disclosure.

FIG. 1 is a perspective view of the exterior of a battery pack according to an embodiment of the present disclosure, FIG. 2 is a perspective view of a bottom plate of a pack housing of FIG. 1, and FIG. 3 is an exploded perspective view of a hole cover assembly according to an embodiment of the present disclosure.

Referring to FIGS. 1 through 3, an energy storage system (ESS) battery pack for home use according to an embodiment of the present disclosure includes battery cells (not shown), a pack housing 10 accommodating the battery cells, a venting hole 20 provided in at least one surface of the pack housing 10, and a hole cover assembly 30 installed in the venting hole 20.

A lithium ion secondary battery may be employed as each of the battery cells (not shown), and includes an electrode assembly, an electrolyte, and an outer casing that seals the electrode assembly and the electrolyte. Battery cells may be classified into a pouch type, a cylindrical type, and a prismatic type according to the shapes of outer casings, and do not need to be limited to a specific shape.

The electrode assembly is an assembly of an electrode and a separator, and may be configured such that one or more positive electrode plates and one or more negative electrode plates are disposed with a separator interposed therebetween. An electrode tab may be included in each electrode plate of the electrode assembly and may be connected to an electrode lead. For example, in the case of a pouch-type secondary battery, one or more electrode tabs may be connected to an electrode lead. The electrode lead may have one end exposed to the outside by being interposed between pouch outer casings, and thus may function as an electrode terminal.

The configuration of such a pouch-type secondary battery is obvious to those skilled in the art to which the present disclosure pertains, and thus a more detailed description thereof will be omitted. In an ESS battery pack for home use according to the present disclosure, various secondary batteries known at the time of filing of the present disclosure may be employed.

The pack housing 10 may include a bottom plate 11 forming a bottom surface, a top plate 12 forming a top surface, and a housing main body 13 having a hollow structure. The housing main body 13 may be manufactured by extrusion molding, and forms front, rear, and both side surfaces of the pack housing 10.

Although the housing main body 13 is not shown in detail in the drawings, the housing main body 13 may be provided such that a lower end portion of the housing main body 13 may be coupled to the bottom plate 11 by bolting or hooking and an upper end portion of the housing main body 13 may be coupled to the top plate 12 by bolting or hooking.

The pack housing 10 may include an internal space surrounded by the bottom plate 11, the top plate 12, and the housing main body 13, and may protect battery cells and other embedded component parts from external impacts or vibrations by being formed of a metal material having high mechanical rigidity.

The venting hole 20 is a unit for discharging a gas generable by battery cells from the pack housing 10, and one or more venting holes 20 may be provided in at least one surface of the pack housing 10.

According to the present embodiment, the venting hole 20 may be provided in the bottom plate 11. In other words, when the venting hole 20 is provided in the top plate 12 or the housing main body 13, rainwater may flow into the pack housing 10 through the venting hole 20 in rainy weather, and foreign substances or dust may fall and are prone to be accumulated around the venting hole 20.

However, when the venting hole 20 is provided in the bottom plate 11, there is no room for rainwater to flow in through the venting hole 20, and foreign substances or dust do not fall and accumulate around the venting hole 20.

According to the present embodiment, the venting hole 20 is implemented to have a rectangular shape. However, the venting hole 20 does not necessarily have a rectangular shape. If necessary, the venting hole 20 may be configured in various shapes, such as a circle, an ellipse, and a polygon, and various sizes.

The hole cover assembly 30 covers the venting hole 20 to satisfy waterproofing and dustproofing of an ESS battery pack, and is configured to be fixedly coupled to the bottom plate 11.

As shown in FIGS. 2 and 3, the hole cover assembly 30 according to the present embodiment may include a filter mesh 31, a mounting plate 34, and a bolt member 35.

The filter mesh 31 is formed by integrating a resin filter layer 32 formed of a resin with a mesh 33 made of a metal material by insert injection molding. In other words, the filter mesh 31 may be formed by putting a pre-fabricated metal mesh 33 in an injection mold and molding a filter layer with a resin. That is, the filter mesh 31 may be a result of taking unique advantages of conventional several waterproof and dustproof units including a mesh 33 and a filter by closely adhering the conventional several waterproof and dustproof units into a single product.

Compared with manufacturing a fiber filter and a mesh separately, laminating and aligning them, and installing a result of the lamination and alignment in the venting hole 20, as the waterproof and dustproof unit mentioned in the last paragraph of the Background Art section, the filter mesh 31 according to the present disclosure is a single product, and thus may be directly installed in the venting hole 20 without stacking and aligning the resin filter layer 32 and the mesh network 33.

Moreover, because the filter mesh 31 is obtained by closely adhering the resin filter layer 32 having low rigidity and the mesh 33 having a somewhat insufficient waterproof function each other, the disadvantage of the resin filter layer 32 and the disadvantage of the mesh 33 may be complemented each other, and thus the filter mesh 31 may have both waterproof and dustproof performance and excellent durability.

The resin filter layer 32 may have a porous structure capable of filtering out micro-sized foreign substances. Resins having excellent heat resistance, such as a fluororesin, a polyurethane resin, and an epoxy resin, may be used as a resin used for molding the resin filter layer 32.

For example, the fluororesin has very excellent properties such as heat resistance, chemical resistance, low temperature resistance, electrical insulation, and high frequency characteristics compared to general plastics. However, the scope of the present disclosure is not limited to the specific types of resin. Resins having various chemical properties, such as resins for suppressing occurrence of fire, may be applied as the resin used for molding the resin filter layer 32.

The mesh 33 interrupts introduction of foreign substances and supports the resin filter layer 32. The mesh 33 may be provided with a hole size less than or equal to 1 mm horizontal×1 mm vertical. The mesh 33 may be made of a material with good rigidity, such as stainless steel. However, the mesh 33 is not necessarily made of stainless steel, and any material with good heat resistance and good durability may be used.

Figure 4:
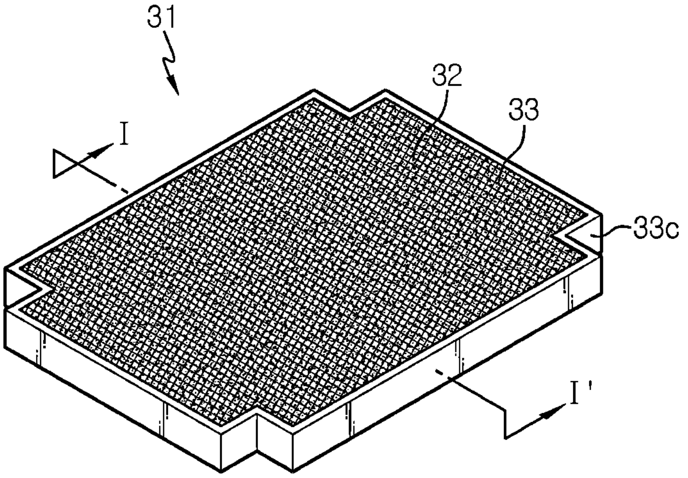
FIG. 4 is a perspective view of a filter mesh of FIG. 3.
Figure 5:
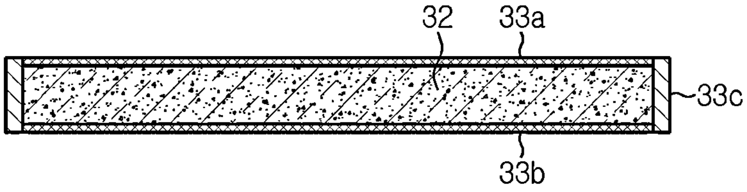
FIG. 5 is a cross-sectional view of the filter mesh of FIG. 4 taken along line I-I'.

FIG. 4 is a perspective view of the filter mesh of FIG. 3, and FIG. 5 is a cross-sectional view taken along line I-I' of FIG. 4.

Describing the structure of the filter mesh 31 according to the present embodiment in detail with reference to FIGS. 4 and 5, the mesh 33 includes a first mesh 33*a*, a second mesh 33*b*, and an outer frame 33*c*, and the resin filter layer 32 is located between the first mesh 33*a* and the second mesh 33*b*.

The first mesh 33*a* and the second mesh 33*b* may be provided in the same shape and the same size, and may be configured to face each other at a predetermined distance apart from each other. Respective edge regions of the first mesh 33*a* and the second mesh 33*b* may be connected to the outer frame 33*c*, and thus the first mesh 33*a* and the second mesh 33*b* may keep a constant distance therebetween. The resin filter layer 32 may be located between the first mesh 33*a* and the second mesh 33*b* and may be surrounded by the outer frame 33*c*.

According to this structure, the resin filter layer 32 is not easily distorted by strong impacts or heat by being interposed in a space surrounded by the first mesh 33*a*, the second mesh 33*b*, and the outer frame 33*c*.

Figure 6:
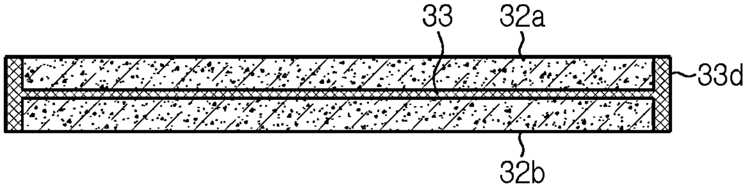
FIG. 6 is a drawing corresponding to FIG. 5 and is a cross-sectional view of a modification of the filter mesh of FIG. 5.

FIG. 6 is a drawing corresponding to FIG. 5 and is a cross-sectional view of a modification of the filter mesh 31.

In a filter mesh 31 according to a modification of the present embodiment, a resin filter layer is divided into a first filter layer 32*a* and a second filter layer 32*b*, and the mesh 33 may be located between the first filter layer 32*a* and the second filter layer 32*b*.

For example, as shown in FIG. 6, the first filter layer 32*a* may be located above the mesh 33, and the second filter layer 32*b* may be located below the mesh 33 to be apart from the first filter layer 32*a*. The mesh 33 may be configured in an approximately "H" shape such that its edge region 33*d* extends in a vertical direction to surround the first filter layer 32*a* and the second filter layer 32*b*.

According to this structure, the mesh 33 that is relatively rigid acts as a skeleton inside the resin filter layer 32 to prevent deformation of the resin filter layer 32. In addition, a contact surface between the mesh network 33 and the resin filter layer 32 spans a wide area in all directions during insert injection molding, and thus a bonding strength between the two materials may be improved.

The mounting plate 34 is a mediation unit for attaching the filter mesh 31 to the bottom plate 11, and is provided in the form of a frame having an empty center. According to the present embodiment, the mounting plate 34 is provided in the form of a quadrangular frame corresponding to four sides corresponding to the edges of the filter mesh 31 and thus presses the four sides of the filter mesh 31 and is fastened to the bottom plate 11 by bolts.

Referring back to FIG. 3, an assembly of the hole cover assembly 30 and the bottom plate 11 will now be described.

The bottom plate 11 includes a recessed portion 11*a* recessed along the outer periphery of the venting hole 20 so as to be able to mount the edges of the filter mesh 31. For example, as shown in FIG. 3, the recessed portion 11*a* may be formed by a predetermined depth from an upper surface of the bottom plate 11 to form a step with the upper surface. The filter mesh 31 is seated on an edge region of the recessed portion 11*a* and accordingly does not enter the venting hole 20.

The recessed portion 11*a* includes, in its corner region, a column 11*b* in which a thread is formed along the inner circumferential surface of its inner diameter. The column 11*b* is provided such that its height substantially coincides with a thickness of the filter mesh 31. According to the present embodiment, four columns 11*b* are provided in four places, considering that the mounting plate 34 has a quadrangular frame shape. However, the number of columns 11*b* and locations of the columns 11*b* may vary.

The filter mesh 31 is provided in a form in which four corner areas are cut out or indented inwards in order to avoid interference with the four columns 11*b*. The mounting plate 34 includes, its four corner areas, bolt fastening holes 34*a* through which bolts may be inserted.

According to this structure, the filter mesh 31 is seated on the recessed portion 11*a* of the bottom plate 11, and the mounting plate 34 is disposed above the filter mesh 31. At this time, the columns 11*b* are positioned at the four corner areas of the filter mesh 31, and the bolt fastening holes 34*a* of the mounting plate 34 coincide with the inner diameters of the columns 11*b*.

Then, the mounting plate 34 is fixed to the columns 11*b* by using bolt members 35. At this time, the four sides of the filter mesh 31 are pressed between the recessed portion 11*a* and the mounting plate 34, and thus the filter mesh 31 may be firmly fixed.

In the assembly structure and the components of the hole cover assembly 30 according to an embodiment of the present disclosure, in an emergency, the gas generated inside the pack housing 10 may be discharged to the outside through the venting hole 20 and the filter mesh 31, and, in normal times, the filter mesh 31 may prevent introduction of moisture or foreign substances into the pack housing 10 through the venting hole 20.

In particular, because the filter mesh 31 is formed by integrating the resin filter layer 32 and the metal mesh 33 into one product by insert injection, the filter mesh 31 is easily assembled when applied to the venting hole 20 and has a reduced thickness required for waterproofing and dustproofing compared with conventional ones.

An ESS battery pack according to the present disclosure may further include various devices for controlling charging and discharging of battery cells, such as a battery management system (BMS), a relay, a current sensor, and a fuse that may be built in the pack housing, in addition to the above-described components.

Although embodiments of the present disclosure have been illustrated and described above, the present disclosure is not limited to the above-described embodiments, and various modifications can be made by anyone with ordinary skill in the art to which the disclosure pertains, without departing from the gist of the present disclosure claimed in the claims.

Meanwhile, although terms indicating directions such as up, down, left, and right are used in the present specification, these terms are only for convenience of description, and it is apparent to those skilled in the art that these terms may vary depending on a position of a target object or a position of an observer.

What is claimed is:

1. A pack housing including an internal space capable of accommodating battery cells, the pack housing comprising:

a venting hole provided in at least one surface of the pack housing to communicate with the internal space;

a hole cover assembly configured to cover the venting hole;

a step formed in the venting hole, an opening in the step being smaller than the hole cover assembly; and a column on the step, wherein the hole cover assembly comprises:

a filter mesh comprising a resin filter layer formed of a resin and a mesh integrated with the resin filter layer by insert injection, and placed in the venting hole; and a mounting plate including a frame having an empty center and coupled to the column while pressing an edge region of the filter mesh.

2. The pack housing of claim 1, wherein the at least one surface is at least one of a bottom plate forming a bottom surface of the pack housing and a top plate forming a top surface of the pack housing.

3. The pack housing of claim 1, wherein the mesh is formed of a metal material, and comprises a first mesh and a second mesh disposed to face the first mesh a predetermined distance apart from the first mesh, and wherein the resin filter layer is located between the first mesh and the second mesh.

4. The pack housing of claim 3, wherein the mesh further comprises an outer frame connected to an edge region of the first mesh and an edge region of the second mesh and surrounding the resin filter layer.

5. The pack housing of claim 1, wherein the resin filter layer comprises a first filter layer and a second filter layer disposed to face the first filter layer a predetermined distance apart from the first filter layer, and wherein the mesh is formed of a metal material, and is located between the first filter layer and the second filter layer.

6. The pack housing of claim 5, wherein an edge region of the mesh extends in a vertical direction to surround the first filter layer and the second filter layer.

7. The pack housing of claim 1, wherein the resin filter layer is made of at least one of a fluororesin, a polyurethane resin, and an epoxy resin.

8. The pack housing of claim 2, wherein the pack housing comprises a housing main body formed in a hollow structure and having a lower end portion coupled to the bottom plate and an upper end portion coupled to the top plate.

9. The pack housing of claim 2, wherein the column has a thread along an inner circumferential surface of an inner diameter, and wherein a corner region of the filter mesh is cut out, and the mounting plate has a bolt fastening hole in a corner area and is fixed by a bolt member fitted into the bolt fastening hole and fastened to the column.

10. An energy storage system (ESS) battery pack for home use including the pack housing of claim 1.

11. The pack housing of claim 1, wherein the venting hole and an outer periphery of the mounting plate have a same shape.

12. The pack housing of claim 1, wherein a top of the column is below a top edge of the venting hole.

* * * * *